US007856461B2

(12) United States Patent
Venkatesan et al.

(10) Patent No.: US 7,856,461 B2
(45) Date of Patent: Dec. 21, 2010

(54) HIGH AVAILABILITY FOR DISTRIBUTED NON-PERSISTENT EVENT PROPAGATION (75) Inventors: Ramkumar Venkatesan, Foster City, CA (US); Krishnan Meiyyappan, Fremont, CA (US); Alan Downing, Fremont, CA (US); James W. Stamos, Saratoga, CA (US)

(73) Assignee: Oracle International Corporation, Redwood Shores, CA (US)

( * ) Notice: Subject to any disclaimer, the term of this patent is extended or adjusted under 35 U.S.C. 154(b) by 1187 days.

(21) Appl. No.: 11/224,770

(22) Filed: Sep. 12, 2005

(65) Prior Publication Data
US 2007/0061444 A1 Mar. 15, 2007

(51) Int. Cl.
*G06F 17/00* (2006.01)
(52) U.S. Cl. .................. 707/955; 707/953; 707/960; 707/999.103; 707/999.105
(58) Field of Classification Search ................ 707/953, 707/955, 960, 999.103, 999.105
See application file for complete search history.

(56) References Cited

U.S. PATENT DOCUMENTS

| 6,817,018 | B1 | 11/2004 | Clarke et al. |
| 6,920,635 | B1 | 7/2005 | Lodrige et al. |
| 7,020,480 | B2* | 3/2006 | Coskun et al. ............... 455/466 |
| 7,085,758 | B2 | 8/2006 | Barsness et al. |
| 7,181,482 | B2 | 2/2007 | Jain et al. |
| 2004/0139166 | A1 | 7/2004 | Collison |
| 2004/0240444 | A1 | 12/2004 | Matthews et al. |
| 2006/0056413 | A1 | 3/2006 | Ikeda et al. |
| 2007/0005800 | A1 | 1/2007 | Banks et al. |
| 2007/0162511 | A1 | 7/2007 | Venkatesan et al. |
| 2007/0180297 | A1 | 8/2007 | Byrne et al. |

* cited by examiner

*Primary Examiner*—Sana Al-Hashemi
(74) *Attorney, Agent, or Firm*—Hickman Palermo Truong & Becker LLP (57) ABSTRACT Techniques are provided for maintaining high propagation availability for non-persistent messages. Destination-to-instance mapping information is provided to a listener process for a cluster database. The destination-to-instance mapping indicates the current owner instance of each single-instance destination within the cluster database. To establish a connection to a single-instance destination, a sending process sends a connection request to the global listener. The connection request identifies the desired destination queue, but not the owner instance of the queue. The global listener for the cluster database uses the destination-to-instance mapping to determine which instance is the current owner of the specified queue, and establishes a connection between the sending process and the appropriate owner instance.

16 Claims, 4 Drawing Sheets

HIGH AVAILABILITY FOR DISTRIBUTED NON-PERSISTENT EVENT PROPAGATION

RELATED APPLICATIONS

The present application is related to the following U.S. Patent Application, the entire contents of which are incorporated herein by reference for all purposes:

U.S. patent application Ser. No. 11/224,918, filed on Sep. 12, 2005, entitled FINER GRAINED POINT-TO-POINT EVENT PROPAGATION, by Krishnan Meiyyappan, Ramkumar Venkatesan and Shailendra Mishra.

FIELD OF THE INVENTION

The present invention relates to propagating messages and, more specifically, maintaining high availability for propagating non-persistent messages.

BACKGROUND

Complex database systems often need to propagate messages within the database system's own database and also from one database to another. For example, a bank may need to transmit a financial transaction across several databases in order to maintain integrity in their records. As another example, a shipping company may need to send package tracking information across several systems in order to make this data available to its customers.

One method employed to transfer information in database systems is to use a data stream infrastructure. One such data stream infrastructure is described in U.S. Pat. No. 6,889,231, entitled "Asynchronous Information Sharing System", the entire contents of which are incorporated herein. Such data stream architectures use the publisher/subscriber model to propagate data and messages in a data stream from sources to subscribed destinations ("targets"). The source and targets of a stream may be within the same database, or in different databases.

Typically, propagating information from a source to a target takes place via queues. Queues act as "post boxes" where different applications can look for "mail" in the form of messages. When a publisher (such as a database server or other application) wants to contact subscribers (such as other database servers or applications), the publisher can leave messages in these queues so that the subscribers will be able to find and retrieve these messages. Queuing also provides a unified framework for processing messages.

Propagating to Buffered Queues in a Cluster

A "cluster" is a system in which multiple database servers ("instances") have access to the same database. A database to which the multiple instances have access is referred to herein as a "cluster database". The persistent storage that stores a cluster database is accessible by all instances in the cluster. In contrast, each instance has its own volatile memory that is not directly accessible to the other instances in the cluster.

Queues can be persistent or buffered. A persistent queue is stored persistently. For example, the entries of a persistent queue may be stored on disk within a table of a database. Since persistent storage is shared by all instances in a cluster, persistent queues may be directly accessed by all instances in a cluster.

In contrast to persistent queues, buffered queues are stored in volatile memory. Consequently, even though a buffered queue is associated with a cluster database that is accessible to many instances, the buffered queue itself may only be directly accessible to the instance in whose volatile memory the buffered queue resides (the "owner instance" of the buffered queue).

Propagating information to a buffered queue in a cluster environment presents a unique challenge because the messages destined for a buffered queue of a cluster database do not merely have to be delivered to the right database, but have to be delivered to the right instance (the owner instance of the target queue). To ensure that messages that are destined for buffered queues are delivered to the correct database instance, database links are allocated on an instance-by-instance basis.

Instance-specific Database Links

Propagation of messages between queues on different databases happens through database links ("dblinks"). When a dblink is initialized, the user specifies various dblink configuration values, including a specific destination instance for the dblink. For example, a typical dblink configuration may appear as follows:

host=oracle.sun. . .
port=abc
protocol=TCP
usemrname=fred
password=xyz
service_name=dbs1
instance-name=instance1

After the dblink has been set up, the dblink may then be used to establish connections with the specified database instance. The configuration information for a database link remains static until it is modified either by a database administrator or some other user.

The same database link may be used to establish connections between several source queues in one database to several target buffered queues in the specified instance of a dblink. For example, a dblink may be established between a database X and an instance 1 associated with database Y. The dblink may be used to propagate messages from a source queue X1 in database X to buffered queues Y1, Y2 and Y3 in instance 1. The same dblink may be used to propagate messages from another source queue X2 in database X to buffered queues Y4, Y5, and Y6 in instance 1.

Connections

Connections are used to propagate messages between a source queue and a destination queue. Dblinks are used to establish connections. For example, assume that a sender process wants to establish a connection in order to propagate messages from queue X1 to queue Y1 on instance 1. The sender process sends a connection request to instance 1 using the dblink associated with instance 1. The connection request is received by a listener process of instance 1. In response to the connection request, the listener process starts a receiving process on instance 1, and establishes the connection between the receiving process and the sending process. After the connection has been established, the sending process and the receiving process communicate directly with each other to propagate the messages from queue X1 to queue Y1.

Example Database Cluster

Figure 1:
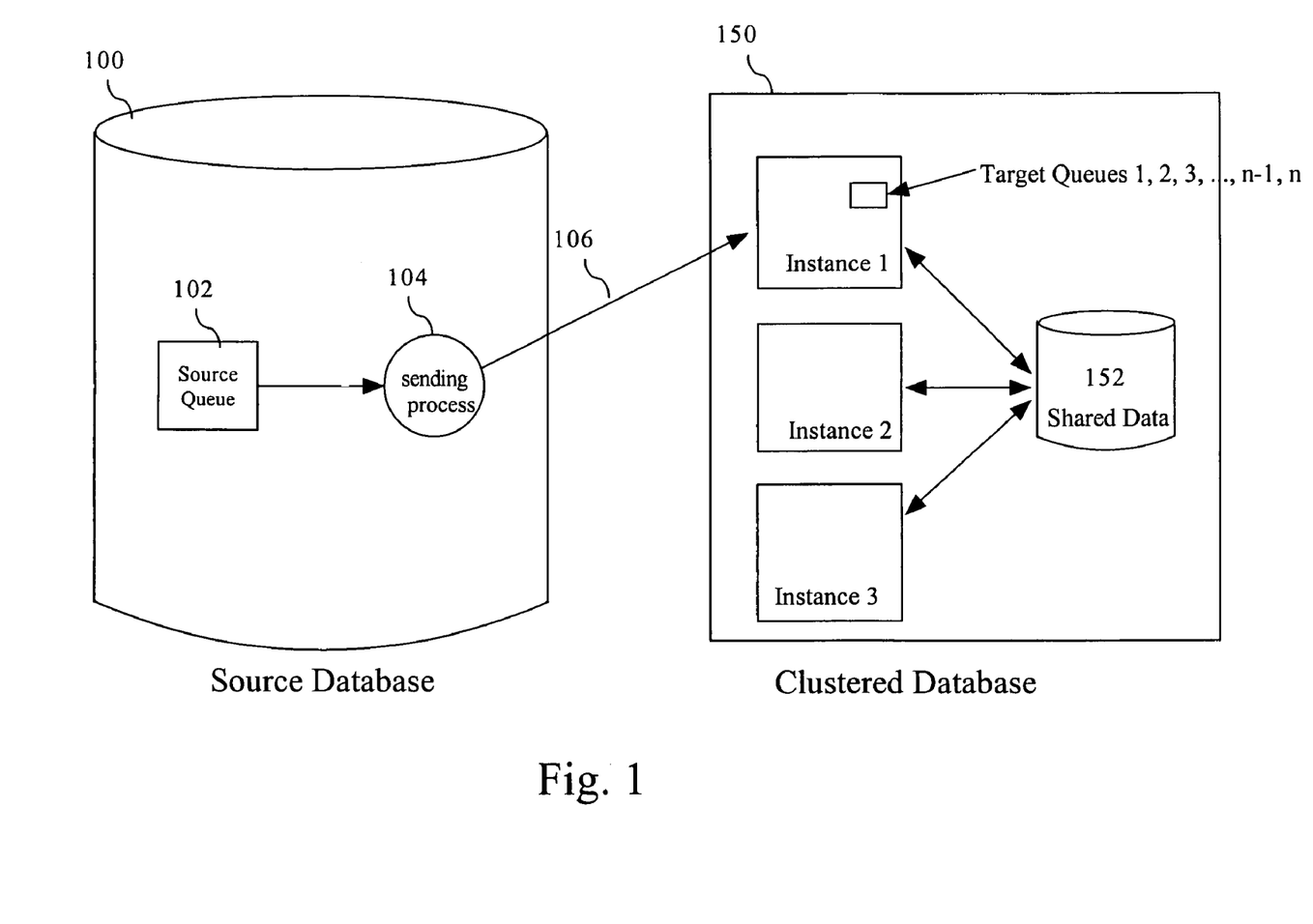
FIG. 1 is a block diagram that illustrates a scenario of propagating information to buffered queues within a clustered database system.

FIG. 1 is a block diagram illustrating a scenario of propagating information to buffered queues within a clustered database system. When a publisher has information to be sent, that information is placed in a source queue 102 of source database 100. Shared data 152 is accessible to multiple instances (instances 1, 2 and 3).

Within the clustered database system, dblinks are allocated on a source-to-target-instance basis. For example, dblink 106 is associated with the database 100 and instance 1 of the clustered database system 150. Thus, dblink 106 may be used to propagate messages from source queue 102 to one or more target buffered queues located on instance 1 of the target database 150, but cannot be used to propagate messages from source queue 102 to buffered queues in any other instance of cluster database system 150.

As mentioned above, the destination instance specified in the dblink configuration data identifies the destination instance for messages that will be sent over the dblink. In the system illustrated in FIG. 1, the dblink configuration would specify instance 1 as the destination instance.

Failure Handling

Figure 2:
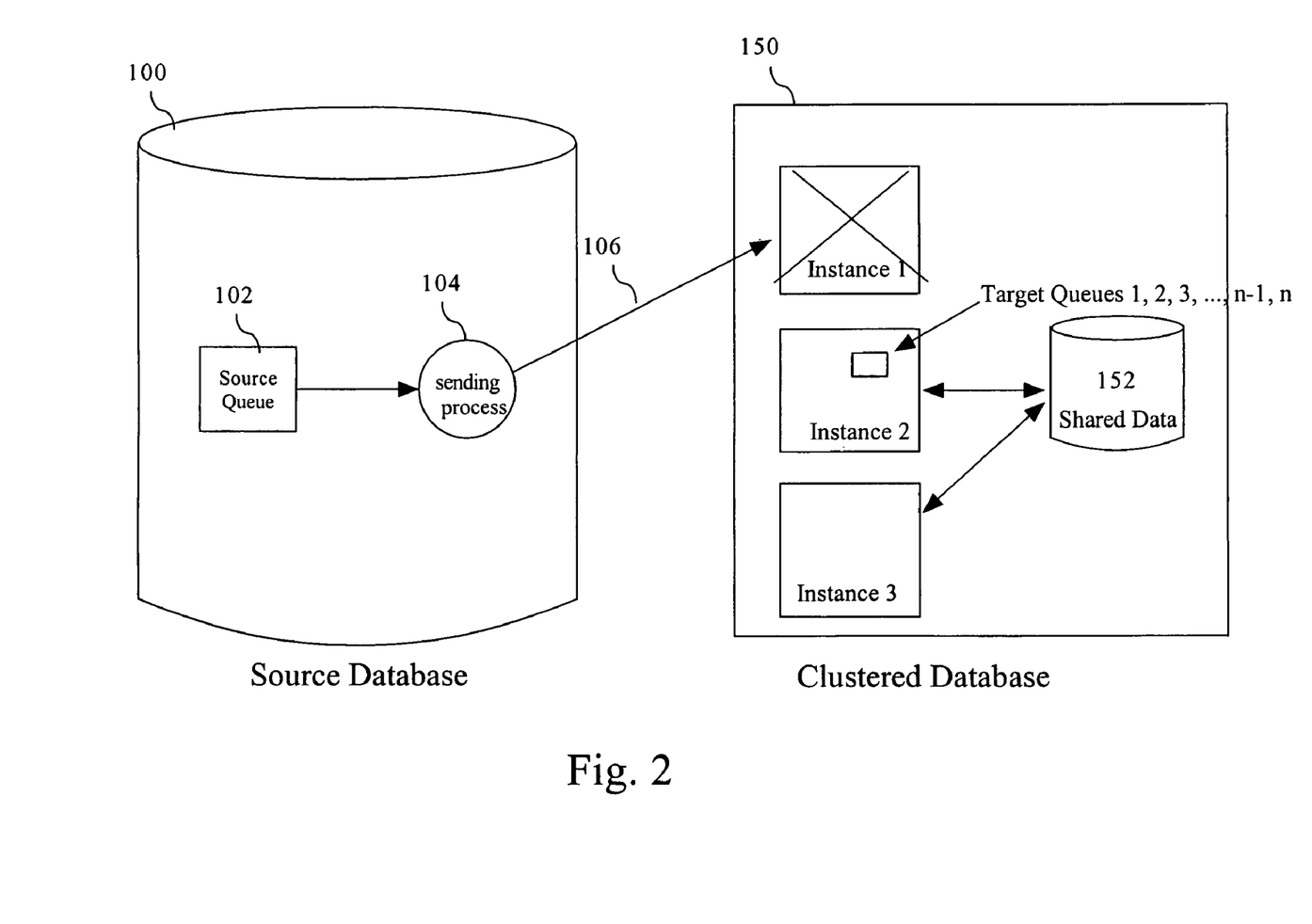
FIG. 2 is a block diagram that illustrates the cluster database system of FIG. 1 after a buffered queue has been migrated to another owner instance.

Problems can arise when messages are propagated to buffered queues in a clustered database. For example, instance 1 of cluster database system 150 may fail. Upon failure of an instance which owns a destination queue, queue ownership automatically migrates to a non-failed instance. For the purpose of illustration, it shall be assumed that database instance 1 has failed, and target queues 1, 2 and 3 have been migrated to instance 2, as illustrated in FIG. 2.

After the migration of a destination queue, subscriber and publisher processes that are local to the migrated queue (processes on the new owner instance) continue to work. For example, subscriber and publisher processes on Instance 2 may continue to use queues 1, 2 and 3. However, the propagation of messages from sources outside the new owner instance to the migrated queue will fail because the connections that had already been established at the time of the migration are to the previous owner instance.

Unfortunately, after the failure of pre-existing connections, attempt to establish new connections will also fail, because the new connection attempts will use a dblink that points to the previous owner-instance. For example, as illustrated in FIG. 2, dblink 106 continues to point to failed instance 1. Attempts by sending process 104 to create a new connection to propagate messages from source queue 102 to any of target queues 1, 2 or 3 will fail because dblink 106 still points to database instance 1.

To correct the propagation problems when a failover occurs, the database administrator drops the dblink associated with the failed node, and determines the new owner instance of the target buffered queue. Once the new owner instance has been determined, the database administer creates a database link to connect to the new owner instance of the destination queue. The inherent delay in the re-configuration leads to disruption and unavailability of message propagation for a certain time period.

Based on the foregoing, it is clearly desirable to provide a method for high availability for distributed non-persistent message propagation.

BRIEF DESCRIPTION OF THE DRAWINGS

The present invention is illustrated by way of example, and not by way of limitation, in the figures of the accompanying drawings and in which like reference numerals refer to similar elements and in which.

DETAILED DESCRIPTION

In the following description, for the purposes of explanation, numerous specific details are set forth in order to provide a thorough understanding of the present invention. It will be apparent, however, that the present invention may be practiced without these specific details. In other instances, well-known structures and devices are shown in block diagram form in order to avoid unnecessarily obscuring the present invention.

Overview

Techniques are provided for maintaining high propagation availability for non-persistent messages. In one embodiment, queue-to-instance mapping information is provided to a listener process for a cluster database. The queue-to-instance mapping indicates the current owner instance of each buffered queue within the cluster database. To establish a connection to buffered queue, a sending process uses an instance-independent dblink to send a connection request to the global listener. The connection request identifies the desired destination queue. The global listener for the cluster database uses the queue-to-instance mapping to determine which instance is the current owner of the specified queue, and establishes a connection between the sending process and the appropriate owner instance.

In the case of a failure, the buffered queues on a failed instance are moved to other instances, and the queue-to-instance mapping information is revised to reflect the changes. Attempts to establish new connections with the migrated queues after the failure are directed to the global listener, not the failed instance. Therefore, such requests will result in connections to the new owner instances of the migrated queues.

Queues as Services

As mentioned above, a queue-to-instance mapping is maintained for determining which instance currently owns a destination buffered queue when a connection to the queue is requested. In one embodiment, such a mapping is maintained by registering each buffered queue as a service. A system in which queues are registered as services is illustrated in FIG. 3.

Figure 3:
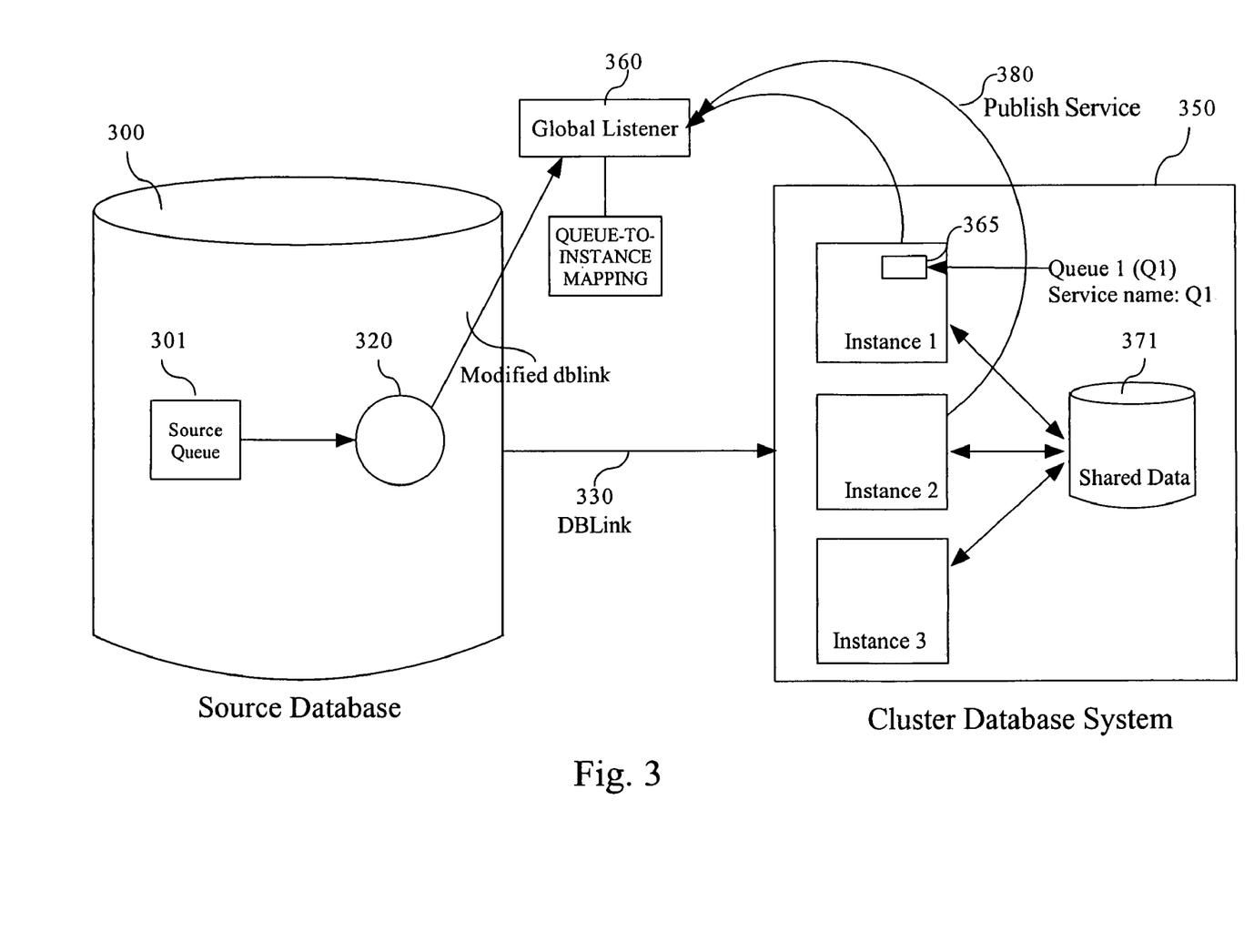
FIG. 3 is a block diagram that illustrates propagating non-persistent information in a clustered database with multiple database instances, according to an embodiment of the invention.

Referring to FIG. 3, the buffered queues of a clustered database system 350 are registered as services with a global listener 360. The registration information for a buffered queue indicates, among other things, the owner instance of the buffered queue. If the owner instance of a buffered queue changes (due to queue migration), then the service registration information for the buffered queue is changed to reflect the new owner instance.

When a sending process 320 desires to establish a connection with a destination queue, the sending process 320 uses an instance-independent dblink to send a service request for the destination queue to the global listener 360. The global listener 360 inspects the registered service information, which contains the queue-to-instance mapping, to determine which instance is the current owner of the specified destination queue. Global listener 360 then uses this information to establish the requested connection.

Instance-Independent Dblinks

According to one embodiment, the configuration information for a dblink no longer identifies a specific instance. Rather, the dblink configuration identifies a service-name that (1) identifies the target cluster database, but (2) is not specific to any database instance. For example, the configuration data for a dblink may appear as follows:
host=oracle.sun . . .
port=abc
protocol=TCP
username=fred
password=xyz
service-name=dbs1.oracle.com Because the dblink configuration does not tie the dblink to any specific target instance, the dblink may be used to connect to any of the instances of the cluster database that is identified by the service name of the dblink.

While the dblink is not tied to any database instance, connections to buffered queues still need to be made with specific database instances. Therefore, without additional information, the dblink is not used to directly communicate with the owner instance of the appropriate destination queue. Rather, as explained above, the dblink is used to communicate with a global listener that is able to identify the owner instance of the destination queue.

Connection Requests

As mentioned above, a sending process uses the instance-independent dblink associated with a cluster database to request a connection to propagate data to a particular destination buffered queue. According to one embodiment, the sending process modifies a copy of the dblink configuration information to create a modified copy that reflects the desired destination queue. For example, assume that a sending process needs to propagate messages to a queue Q1. To establish a connection to Q1, the sending process may modify the dblink configuration data:
host=oracle.sun . . .
port=abc
protocol=TCP
username=fred
password=xyz
service-name=dbs1.oracle.com
by combining the name of the queue with the service name associated with the dblink, resulting in the following modified configuration information:
host=oracle.sun . . .
port=abc
protocol=TCP
username=fred
password=xyz
service-name=Q1.dbs1.oracle.com According to one embodiment, only a volatile copy of the dblink configuration is modified. The durably-stored copy of the dblink configuration remains unchanged. Once the dblink configuration has been modified to specify the destination queue, the sending process sends the connection request using the modified dblink configuration.

Establishing the Connection

Connection requests that are sent to a cluster database service based on instance-independent dblinks are received by a global listening process. Upon receiving a connection request, the global listening process parses the modified dblink configuration information to identify the destination queue. The global listening process then uses the identity of the destination queue and the queue-to-instance mapping information to identify the database instance that currently owns the specified queue. Once the current owner instance of the destination queue is identified, the global listener establishes a connection between the sending process and a receiving process on the current owner instance of the destination queue.

For example, in FIG. 3, dblink 330 is instance-independent in that dblink 330 points to the service provided by cluster database system 350, but not to any particular instance thereof. Sender process 320 modifies a volatile copy of the configuration information of dblink 330. The modified copy indicates Q1 in the service-name field. The modified copy of dblink 330 is used by sending process 320 to request the "service" of Q1. The service request is received by the global listener 360, which uses the registered service information to establish a connection between the sending process 320 and a receiving process on the appropriate owner instance (instance 1).

Queue Migration Example

Referring again to FIG. 3, a source queue 301 within a source database 300 has messages to be propagated to a buffered queue 365 on the target database 350. The target database system 350 includes several database instances 1, 2 and 3 and shared data 371. Initially, database instance 1 owns buffered queue 365.

A queue service is registered with global listener 360 for each buffered queue. According to one embodiment, the service name for each buffered queue includes the name of the buffered queue. For example, the name of queue 365 is Q1 and the name given to the service associated with queue 365 is also Q1.

Global listener process 360 listens for incoming client connection requests. According to one embodiment, the global listener process 360 is located separate from the clustered database system so that the global listener process 360 can have access to all of the instances of the clustered database system 350. The queue service for each of the buffered queues is published 380 to the global listener 360.

Sending process 320 uses a modified version of dblink 330 to request a connection to the service associated with queue 365, as described above. Based on the information in the modified dblink, a connection is established by global listener 360 between the sending process 320 and a receiving process on instance 1. Once the connection is established between the sending process 320 and a receiving process on instance 1, sending process 320 may propagate any number of messages over the connection to queue 365.

For a variety of reasons, queue 365 may be migrated from instance 1 to instance 2. For example, the migration of queue 365 may be performed automatically in response to the failure of instance 1. Even if instance 1 has not failed, queue 365 may migrated to instance 2 for load balancing purposes. In response to migrating queue 365 to instance 2, new service information for queue 365 is published to global listener 360. The new service information indicates that instance 2 is now the owner instance of queue 365.

After the migration of queue 365 to instance 2, attempts by sending process 320 to send messages over the existing connection to instance 1 will fail. In response to the connection failure, sending process 320 will attempt to re-establish a connection to queue 365. The process of establishing a new connection will proceed in the same manner as has been described for establishing the initial connection. However, since the queue-to-instance mapping information used by global listener 360 now indicates that instance 2 is the instance owner of queue 365, the new connection will be established between the sending process 320 and a receiving process on instance 2.

Other Single-Instance Communications

Techniques for improving availability of services provided by a cluster have been described in the context of propagating messages to a buffered queue that resides in the volatile memory of one instance of a cluster. However, these same availability-enhancing techniques may be used in contexts that do not involve buffered queue propagation. Specially, these techniques may be used to improve availability in any situation that involves single-instance destinations in a cluster database. For example, these techniques may be employed when:

dequeuing from a remote buffered queue enqueuing to a remote buffered queue reading from a remote named pipe writing to a remote named pipe calling an instance-specific remote procedure call In each case in this non-exhaustive list of examples, a single-instance destination may register itself, as a service, with a global listener. The registration information for the single-instance destination identifies the current owner instance of the service. If the owner instance changes for any reason, the registration information is changed to reflect the new owner instance. Connections are established with the single-instance destination indirectly, by communicating with the global listener. The global listener creates connections based on the registration information, so that connections that are created after the migration of a service will be established with the new instance owners of migrated services.

Hardware Overview

Figure 4:
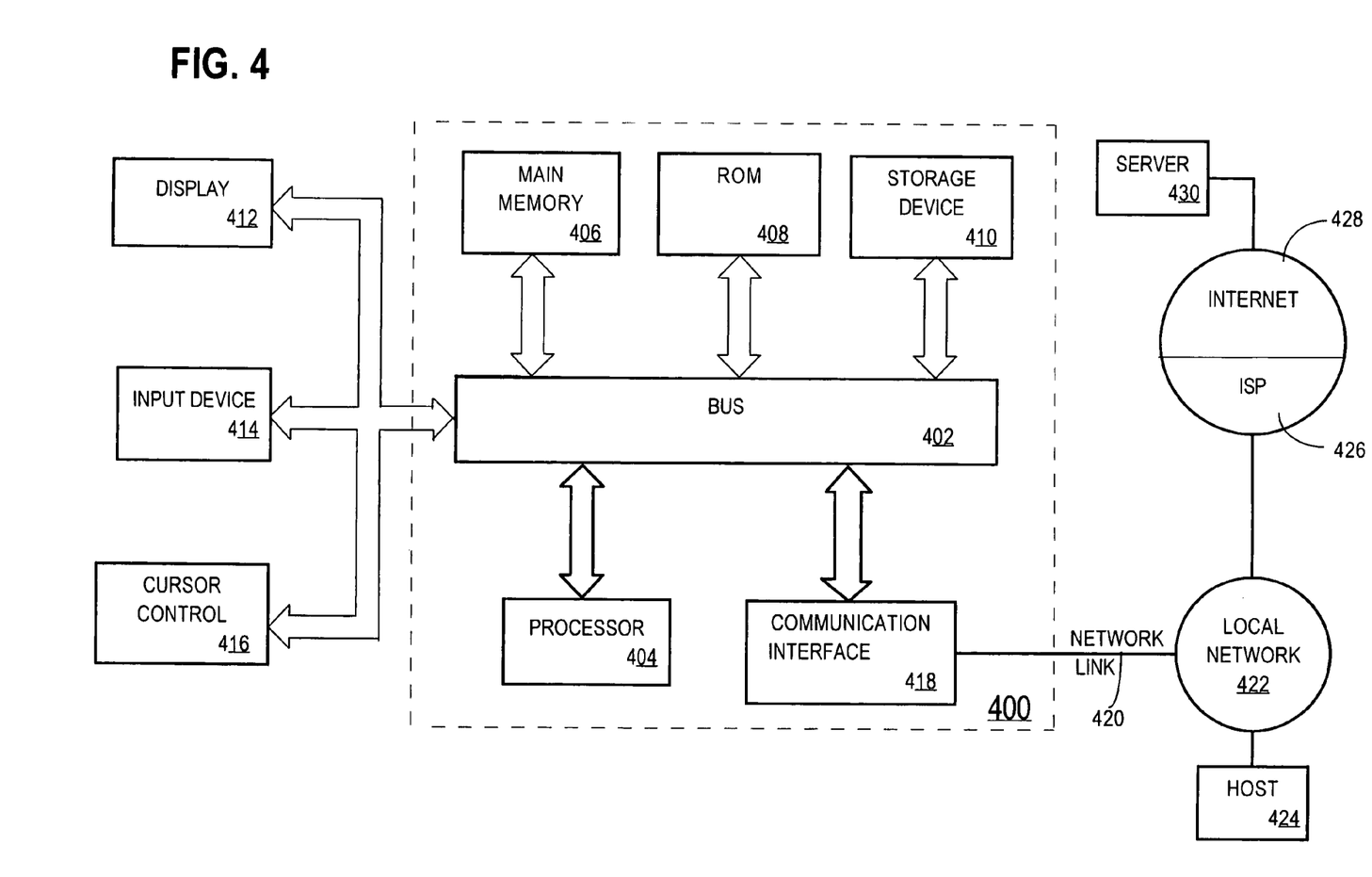
FIG. 4 is a block diagram that illustrates a computer system upon which embodiments of the invention may be implemented.

FIG. 4 is a block diagram that illustrates a computer system 400 upon which an embodiment of the invention may be implemented. Computer system 400 includes a bus 402 or other communication mechanism for communicating information, and a processor 404 coupled with bus 402 for processing information. Computer system 400 also includes a main memory 406, such as a random access memory (RAM) or other dynamic storage device, coupled to bus 402 for storing information and instructions to be executed by processor 404. Main memory 406 also may be used for storing temporary variables or other intermediate information during execution of instructions to be executed by processor 404. Computer system 400 further includes a read only memory (ROM) 408 or other static storage device coupled to bus 402 for storing static information and instructions for processor 404. A storage device 410, such as a magnetic disk or optical disk, is provided and coupled to bus 402 for storing information and instructions.

Computer system 400 may be coupled via bus 402 to a display 412, such as a cathode ray tube (CRT), for displaying information to a computer user. An input device 414, including alphanumeric and other keys, is coupled to bus 402 for communicating information and command selections to processor 404. Another type of user input device is cursor control 416, such as a mouse, a trackball, or cursor direction keys for communicating direction information and command selections to processor 404 and for controlling cursor movement on display 412. This input device typically has two degrees of freedom in two axes, a first axis (e.g., x) and a second axis (e.g., y), that allows the device to specify positions in a plane.

The invention is related to the use of computer system 400 for implementing the techniques described herein. According to one embodiment of the invention, those techniques are performed by computer system 400 in response to processor 404 executing one or more sequences of one or more instructions contained in main memory 406. Such instructions may be read into main memory 406 from another machine-readable medium, such as storage device 410. Execution of the sequences of instructions contained in main memory 406 causes processor 404 to perform the process steps described herein. In alternative embodiments, hard-wired circuitry may be used in place of or in combination with software instructions to implement the invention. Thus, embodiments of the invention are not limited to any specific combination of hardware circuitry and software.

The term "machine-readable medium" as used herein refers to any medium that participates in providing data that causes a machine to operation in a specific fashion. In an embodiment implemented using computer system 400, various machine-readable media are involved, for example, in providing instructions to processor 404 for execution. Such a medium may take many forms, including but not limited to, non-volatile media, volatile media, and transmission media. Non-volatile media includes, for example, optical or magnetic disks, such as storage device 410. Volatile media includes dynamic memory, such as main memory 406. Transmission media includes coaxial cables, copper wire and fiber optics, including the wires that comprise bus 402. Transmission media can also take the form-of acoustic or light waves, such as those generated during radio-wave and infra-red data communications.

Common forms of machine-readable media include, for example, a floppy disk, a flexible disk, hard disk, magnetic tape, or any other magnetic medium, a CD-ROM, any other optical medium, punchcards, papertape, any other physical medium with patterns of holes, a RAM, a PROM, and EPROM, a FLASH-EPROM, any other memory chip or cartridge, a carrier wave as described hereinafter, or any other medium from which a computer can read.

Various forms of machine-readable media may be involved in carrying one or more sequences of one or more instructions to processor 404 for execution. For example, the instructions may initially be carried on a magnetic disk of a remote computer. The remote computer can load the instructions into its dynamic memory and send the instructions over a telephone line using a modem. A modem local to computer system 400 can receive the data on the telephone line and use an infra-red transmitter to convert the data to an infra-red signal. An infra-red detector can receive the data carried in the infra-red signal and appropriate circuitry can place the data on bus 402. Bus 402 carries the data to main memory 406, from which processor 404 retrieves and executes the instructions. The instructions received by main memory 406 may optionally be stored on storage device 410 either before or after execution by processor 404.

Computer system 400 also includes a communication interface 418 coupled to bus 402. Communication interface 418 provides a two-way data communication coupling to a network link 420 that is connected to a local network 422. For example, communication interface 418 may be an integrated services digital network (ISDN) card or a modem to provide a data communication connection to a corresponding type of telephone line. As another example, communication interface 418 may be a local area network (LAN) card to provide a data communication connection to a compatible LAN. Wireless links may also be implemented. In any such implementation, communication interface 418 sends and receives electrical, electromagnetic or optical signals that carry digital data streams representing various types of information.

Network link 420 typically provides data communication through one or more networks to other data devices. For example, network link 420 may provide a connection through local network 422 to a host computer 424 or to data equipment operated by an Internet Service Provider (ISP) 426. ISP 426 in turn provides data communication services through the world wide packet data communication network now commonly referred to as the "Internet" 428. Local network 422 and Internet 428 both use electrical, electromagnetic or optical signals that carry digital data streams. The signals through the various networks and the signals on network link 420 and through communication interface 418, which carry the digital data to and from computer system 400, are exemplary forms of carrier waves transporting the information.

Computer system 400 can send messages and receive data, including program code, through the network(s), network link 420 and communication interface 418. In the Internet example, a server 430 might transmit a requested code for an application program through Internet 428, ISP 426, local network 422 and communication interface 418.

The received code may be executed by processor 404 as it is received, and/or stored in storage device 410, or other non-volatile storage for later execution. In this manner, computer system 400 may obtain application code in the form of a carrier wave.

In the foregoing specification, embodiments of the invention have been described with reference to numerous specific details that may vary from implementation to implementation. Thus, the sole and exclusive indicator of what is the invention, and is intended by the applicants to be the invention, is the set of claims that issue from this application, in the specific form in which such claims issue, including any subsequent correction. Any definitions expressly set forth herein for terms contained in such claims shall govern the meaning of such terms as used in the claims. Hence, no limitation, element, property, feature, advantage or attribute that is not expressly recited in a claim should limit the scope of such claim in any way. The specification and drawings are, accordingly, to be regarded in an illustrative rather than a restrictive sense.

What is claimed is:

1. A machine implemented method comprising:
    maintaining destination-to-instance mapping information that indicates which database server instance, of a plurality of database server instances that have access to a database in a cluster, is a current owner of a single-instance destination associated with the database, wherein the destination-to-instance mapping information indicates that a first database server instance currently owns the single instance destination;
    establishing, based at least in part on the destination-to-instance mapping information, a connection between the first database server instance, which currently owns the single-instance destination, and a source that desires to establish a connection with the single-instance destination;
    receiving information indicating that ownership of the single-instance destination has migrated from the first database server instance to a second database server instance;
    in response to receiving information indicating that ownership of the single-instance destination has migrated from the first database server instance to the second database server instance, updating the destination-to-instance mapping to reflect that the second database server instance is now the current owner of the single-instance destination; and
    establishing, based at least in part on the updated destination-to-instance mapping information, a connection between the second database server instance, which currently owns the single-instance destination, and the source;
    wherein the method is performed by one or more computing devices.

2. The method of claim 1, further comprising:
    receiving registration information to register the single-instance destination as a service, the registration information indicating which database server instance is the current owner of the single-instance destination; and
    updating the destination-to-instance mapping information based on the registration information received.

3. The method of claim 1 wherein the single-instance destination is migrated from the first database server instance to the second database server instance in response to failure of the first database server instance.

4. The method of claim 1 wherein the single-instance destination is migrated from the first database server instance to the second database server instance in response to load balancing.

5. The method of claim 1, wherein the source is associated with a database that is different from the database to which the plurality of database server instances have access.

6. The method of claim 1 wherein:
    the single-instance destination is a buffered queue; and
    the destination-to-instance mapping information is queue-to-instance mapping information.

7. The method of claim 1, further comprising:
    establishing, based at least in part on the destination-to-instance mapping information, a connection between the second database server instance and a new source that desires to establish a connection with the single-instance destination.

8. A machine-readable storage medium storing instructions which, when executed by one or more processors, cause the one or more processors to perform the following operations:
    maintaining destination-to-instance mapping information that indicates which database server instance, of a plurality of database server instances that have access to a database in a cluster, is a current owner of a single-instance destination associated with the database, wherein the destination-to-instance mapping information indicates that a first database server instance currently owns the single instance destination;
    establishing, based at least in part on the destination-to-instance mapping information, a connection between the first database server instance, which currently owns the single-instance destination, and a source that desires to establish a connection with the single-instance destination;

receiving information indicating that ownership of the single-instance destination has migrated from the first database server instance to a second database server instance;

in response to receiving information indicating that ownership of the single-instance destination has migrated from the first database server instance to the second database server instance, updating the destination-to-instance mapping to reflect that the second database server instance is now the current owner of the single-instance destination; and establishing, based at least in part on the updated destination-to-instance mapping information, a connection between the second database server instance, which currently owns the single-instance destination, and the source.

9. The machine-readable storage medium of claim 8, wherein the single-instance destination is migrated from the first database server instance to the second database server instance in response to failure of the first database server instance.

10. The machine-readable storage medium of claim 8, wherein the single-instance destination is migrated from the first database server instance to the second database server instance in response to load balancing.

11. The machine-readable storage medium of claim 8, wherein the instructions cause the one or more processors to further perform the following operation:

establishing, based at least in part on the destination-to-instance mapping information, a connection between the second database server instance and a new source that desires to establish a connection with the single-instance destination.

12. A machine implemented method comprising:

maintaining destination-to-instance mapping information that indicates which database server instance, of a plurality of database server instances in a database cluster that have access to a database, is a current owner of a single-instance destination associated with the database;

receiving a connection request from a source to establish a connection with the single-instance destination, wherein the connection request is received via an instance-independent database link that is associated with the database but is not associated with any particular database server instance in the database cluster;

determining, based at least in part on the destination-to-instance mapping information, which database server instance in the database cluster is a current owner of the single-instance destination;

establishing a connection between the source and the database server instance that currently owns the single-instance destination;

receiving information indicating that ownership of the single-instance destination has migrated to another database server instance;

in response to receiving information indicating that ownership of the single-instance destination has migrated to another database server instance, updating the destination-to-instance mapping to reflect that the other database server instance is now the current owner of the single-instance destination;

receiving another connection request from the source via the instance-independent database link to establish a connection with the single-instance destination; and establishing, based at least in part on the updated destination-to-instance mapping information, a connection between the other database server instance, which currently owns the single-instance destination, and the source.

13. A machine-readable storage medium storing instructions which, when executed by one or more processors, cause the one or more processors to perform the operations of:

maintaining destination-to-instance mapping information that indicates which database server instance, of a plurality of database server instances in a database cluster that have access to a database, is a current owner of a single-instance destination associated with the database;

receiving a connection request from a source to establish a connection with the single-instance destination, wherein the connection request is received via an instance-independent database link that is associated with the database but is not associated with any particular database server instance in the database cluster;

determining, based at least in part on the destination-to-instance mapping information, which database server instance in the database cluster is a current owner of the single-instance destination;

establishing a connection between the source and the database server instance that currently owns the single-instance destination;

receiving information indicating that ownership of the single-instance destination has migrated to another database server instance;

in response to receiving information indicating that ownership of the single-instance destination has migrated to another database server instance, updating the destination-to-instance mapping to reflect that the other database server instance is now the current owner of the single-instance destination;

receiving another connection request from the source via the instance-independent database link to establish a connection with the single-instance destination; and establishing, based at least in part on the updated destination-to-instance mapping information, a connection between the other database server instance, which currently owns the single-instance destination, and the source.

14. The machine-readable storage medium of claim 8, wherein the instructions cause the one or more processors to further perform the following operations:

receiving registration information to register the single-instance destination as a service, the registration information indicating which database server instance is the current owner of the single-instance destination; and updating the destination-to-instance mapping information based on the registration information received.

15. The machine-readable storage medium of claim 8, wherein the source is associated with a database that is different from the database to which the plurality of database server instances have access.

16. The machine-readable storage medium of claim 8, wherein:

the single-instance destination is a buffered queue; and the destination-to-instance mapping information is queue-to-instance mapping information.

* * * * *

UNITED STATES PATENT AND TRADEMARK OFFICE
CERTIFICATE OF CORRECTION

| | | |
|---|---|---|
| PATENT NO. | : 7,856,461 B2 | Page 1 of 1 |
| APPLICATION NO. | : 11/224770 | |
| DATED | : December 21, 2010 | |
| INVENTOR(S) | : Ramkumar Venkatesan et al. | |

It is certified that error appears in the above-identified patent and that said Letters Patent is hereby corrected as shown below:

In column 1, line 42, delete ""mail"in" and insert -- "mail" in --, therefor.

In column 2, line 25, delete "usemrname" and insert -- username --, therefor.

In column 8, line 41, delete "form-of" and insert -- form of --, therefor.

Signed and Sealed this
Thirteenth Day of September, 2011

David J. Kappos
*Director of the United States Patent and Trademark Office*